(12) United States Patent
Gao et al.

(10) Patent No.: US 7,960,307 B2
(45) Date of Patent: Jun. 14, 2011

(54) CATALYST COMPOSITION FOR REDUCING GASOLINE SULFUR CONTENT IN CATALYTIC CRACKING PROCESS

(75) Inventors: Xingtao Gao, Edison, NJ (US); James Fu, West Windsor, NJ (US)

(73) Assignee: BASF Corporation, Florham Park, NJ (US)

(*) Notice: Subject to any disclaimer, the term of this patent is extended or adjusted under 35 U.S.C. 154(b) by 569 days.

(21) Appl. No.: 11/714,357

(22) Filed: Mar. 6, 2007

(65) Prior Publication Data

US 2007/0249495 A1    Oct. 25, 2007

Related U.S. Application Data

(60) Provisional application No. 60/782,493, filed on Mar. 15, 2006.

(51) Int. Cl.
*B01J 23/00* (2006.01)
*B01J 21/00* (2006.01)
*B01J 29/00* (2006.01)
*B01J 20/00* (2006.01)

(52) U.S. Cl. ............. 502/247; 502/64; 502/65; 502/66; 502/67; 502/71; 502/73; 502/74; 502/79; 502/87; 502/302; 502/303; 502/304; 502/324; 502/327; 502/340; 502/341; 502/342; 502/343; 502/344; 502/345; 502/346; 502/349; 502/350; 502/351; 502/353; 502/354; 502/407; 502/415; 502/439

(58) Field of Classification Search ............ 502/65, 502/66, 67, 71, 73, 74, 79, 87, 247, 302, 502/303, 304, 324, 327, 340, 341, 342, 343, 502/344, 345, 346, 349, 350, 351, 353, 354, 502/407, 415, 439
See application file for complete search history.

(56) References Cited

U.S. PATENT DOCUMENTS

| | | | | |
|---|---|---|---|---|
| 4,092,271 | A | * | 5/1978 | Sze ........................ 502/243 |
| 4,394,301 | A | * | 7/1983 | Gardner ..................... 502/60 |
| 4,824,815 | A | * | 4/1989 | Kugler ....................... 502/64 |
| 4,975,402 | A | * | 12/1990 | Le Van Mao et al. ........ 502/69 |
| 4,997,799 | A | * | 3/1991 | Clark et al. ................. 502/25 |
| 5,376,608 | A | | 12/1994 | Wormsbecher et al. |
| 5,525,210 | A | | 6/1996 | Wormsbecher et al. |
| 6,036,847 | A | | 3/2000 | Ziebarth et al. |
| 6,482,315 | B1 | | 11/2002 | Roberie et al. |

(Continued)

FOREIGN PATENT DOCUMENTS

EP    2045012    4/2009

(Continued)

OTHER PUBLICATIONS

Beatrice Feron, Pierre Gallezot, Michel Bourgogne: "Hydrothermal Aging of Cracking Catalyst", Journal of Catalysis, vol. 134, 1992, pp. 469-478, XP002457461.

(Continued)

*Primary Examiner* — Cam N Nguyen
(74) *Attorney, Agent, or Firm* — Raymond F. Keller

(57) ABSTRACT

A sulfur reduction catalyst useful to reduce the levels of sulfur in a cracked gasoline product comprises a metal vanadate compound. The metal vanadate compound can be supported on a molecular sieve such as a zeolite in which the metal vanadate compound is primarily located on the exterior surface of the pore structure of the zeolite and on the surface of any matrix material used to bind or support the zeolite.

16 Claims, 2 Drawing Sheets

U.S. PATENT DOCUMENTS

| | | |
|---|---|---|
| 6,635,169 B1 | 10/2003 | Bhore et al. |
| 6,846,403 B2 | 1/2005 | Cheng et al. |
| 6,923,903 B2 | 8/2005 | Chester et al. |
| 6,974,787 B2 | 12/2005 | Chester et al. |
| 7,138,358 B2 * | 11/2006 | Huang et al. ............ 502/326 |
| 2003/0008963 A1 | 5/2003 | Chester et al. |
| 2004/0099573 A1 | 5/2004 | Roberie et al. |
| 2004/0266608 A1 | 12/2004 | Long et al. |
| 2005/0205464 A1 | 9/2005 | Hu et al. |
| 2006/0198774 A1 * | 9/2006 | Cross et al. ............ 423/210 |
| 2008/0274877 A1 * | 11/2008 | Cross et al. ............ 502/84 |

FOREIGN PATENT DOCUMENTS

| | | |
|---|---|---|
| WO | WO8706156 | 10/1987 |
| WO | WO 2004/002620 | 1/2004 |

OTHER PUBLICATIONS

Database Compendex XP 002457462, Engineering Information, Inc., New York, NY, U.S.; Zhang Zailong et al., "Effect of System Pressure Difference and pH Values on the Olefine Products of Catalytic Pyrolysis", Database Accession No. EIX99414769958 the whole document & Shiyou Daxue Xuebao; Shiyou Daxue Xuebao/Journal of the University of Petroleum, China 1998, Univ Pet China, Dongying, China, vol. 22, No. 1, 1998, pp. 60-61.

Database Compendex XP002457463, Engineering Information, Inc., New York, NY, U.S.; Pan Huifang et al., "Design of Vanadium Trapping System for FCC Catalysts", Database Accession No. EIX96143028530 the whole document & Prepr Am Chem Soc Div Pet Chem; Preprints-American Chemical Society, Divison of Petroleum Chemistry; Deactivation and Testing of Hydrocarbon Conversion Catalysis Jul. 1995 ACS, Washington, DC, USA, vol. 40, No. 3, Jul. 1995, pp. 418-420.

PCT International Search Report, International Application No. PCT/US2007/005812, International Filing Date: Jun. 3, 2007, 4 sheets.

* cited by examiner

CATALYST COMPOSITION FOR REDUCING GASOLINE SULFUR CONTENT IN CATALYTIC CRACKING PROCESS

CROSS REFERENCE TO RELATED APPLICATIONS

This application claims the benefit of priority of U.S. Provisional Application Ser. No. 60/782,493, filed on Mar. 15, 2006.

FIELD OF THE INVENTION

This invention relates to the reduction of sulfur in gasoline and other petroleum products produced by a catalytic cracking process. The invention provides a catalytic composition for reducing product sulfur and a process for reducing product sulfur using this composition.

BACKGROUND OF THE INVENTION

Catalytic cracking is a petroleum refining process which is applied commercially on a very large scale. A majority of the refinery gasoline blending pool in the United States is produced by this process, with almost all being produced using the fluid catalytic cracking (FCC) process. In the catalytic cracking process heavy hydrocarbon fractions are converted into lighter products by reactions taking place at elevated temperature in the presence of a catalyst, with the majority of the conversion or cracking occurring in the vapor phase. The feedstock is thereby converted into gasoline, distillate and other liquid cracking products as well as lighter gaseous cracking products of four or less carbon atoms per molecule. The gas partly consists of olefins and partly of saturated hydrocarbons.

During the cracking reactions some heavy material, known as coke, is deposited onto the catalyst. This reduces the activity of the catalyst and regeneration is desired. After removal of occluded hydrocarbons from the spent cracking catalyst, regeneration is accomplished by burning off the coke to restore catalyst activity. The three characteristic steps of the catalytic cracking can be therefore be distinguished: a cracking step in which the hydrocarbons are converted into lighter products, a stripping step to remove hydrocarbons adsorbed on the catalyst and a regeneration step to burn off coke from the catalyst. The regenerated catalyst is then reused in the cracking step.

Catalytic cracking feedstocks normally contain sulfur in the form of organic sulfur compounds such as mercaptans, sulfides and thiophenes. The products of the cracking process correspondingly tend to contain sulfur impurities even though about half of the sulfur is converted to hydrogen sulfide during the cracking process, mainly by catalytic decomposition of non-thiophenic sulfur compounds. The distribution of sulfur in the cracking products is dependent on a number of factors including feed, catalyst type, additives present, conversion and other operating conditions but, in any event a certain proportion of the sulfur tends to enter the light or heavy gasoline fractions and passes over into the product pool. With increasing environmental regulation being applied to petroleum products, for example in the Reformulated Gasoline (RFG) regulations, the sulfur content of the products has generally been decreased in response to concerns about the emissions of sulfur oxides and other sulfur compounds into the air following combustion processes.

One approach has been to remove the sulfur from the FCC feed by hydrotreating before cracking is initiated. While highly effective, this approach tends to be expensive in terms of the capital cost of the equipment as well as operationally since hydrogen consumption is high. Another approach has been to remove the sulfur from the cracked products by hydrotreating. Again, while effective, this solution has the drawback that valuable product octane may be lost when the high octane olefins are saturated.

From the economic point of view, it would be desirable to achieve sulfur removal in the cracking process itself since this would effectively desulfurize the major component of the gasoline blending pool without additional treatment. Various catalytic materials have been developed for the removal of sulfur during the FCC process cycle, but, so far most developments have centered on the removal of sulfur from the regenerator stack gases. An early approach developed by Chevron used alumina compounds as additives to the inventory of cracking catalyst to adsorb sulfur oxides in the FCC regenerator; the adsorbed sulfur compounds which entered the process in the feed were released as hydrogen sulfide during the cracking portion of the cycle and passed to the product recovery section of the unit where they were removed. See Krishna et al, Additives Improve FCC Process, Hydrocarbon Processing, November 1991, pages 59-66. The sulfur is removed from the stack gases from the regenerator but product sulfur levels are not greatly affected, if at all.

An alternative technology for the removal of sulfur oxides from regenerator stack gases is based on the use of magnesium-aluminum spinels as additives to the circulating catalyst inventory in the FCCU. Under the designation DESOX™. used for the additives in this process, the technology has achieved a notable commercial success. Exemplary patents disclosing these types of sulfur removal additives include U.S. Pat. Nos. 4,963,520; 4,957,892; 4,957,718; 4,790,982 and others. Again, however, product sulfur levels are not greatly reduced.

A catalyst additive for the reduction of sulfur levels in the liquid cracking products was proposed by Wormsbecher and Kim in U.S. Pat. Nos 5,376,608 and 5,525,210, using a cracking catalyst additive of an alumina-supported Lewis acid for the production of reduced-sulfur gasoline.

U.S. Pat. No. 6,482,315 discloses a supported vanadium catalyst for sulfur reduction in the form of a separate particle additive. The support material may be organic or inorganic in nature and may be porous or non-porous. Preferably, the support material is an amorphous or paracrystalline inorganic oxide such as, for example, $Al_2O_3$, $SiO_2$, clays or mixtures thereof. The sulfur reduction additives are used as separate particle additives in combination with the conventional catalytic cracking catalyst (normally a faujasite such as zeolite Y) to process hydrocarbon feedstocks in the fluid catalytic cracking (FCC) unit to produce low-sulfur gasoline and other liquid cracking products, such as, for example, light cycle oil that can be used as a low sulfur diesel blend component or as heating oil. The preferred support is alumina. The sulfur reduction additive has a high V content of from 2 to 20 wt. %.

Published patent application, US 2004/0099573 intentionally adds vanadium to the feed stream during operation of the FCC unit. The amount of vanadium compound added to the feed will vary depending upon such factors as the nature of the feedstock used, the cracking catalyst used and the results desired. Generally, the vanadium compound is added to the feed at a rate sufficient to increase the concentration of vanadium in or on the equilibrium catalyst inventory by about 100 to about 20,000 ppm, preferably about 300 to about 5000 ppm, most preferably about 500 to about 2000 ppm, relative to the amount of vanadium initially present in or on the catalyst inventory. The preferred vanadium compounds are selected from vanadium oxalate, vanadium sulfate, vanadium naphthenate, vanadium halides, and mixtures thereof.

U.S. Pat. No. 6,635,169 discloses that a metal component (i.e. V) located within the interior of a zeolite pore structure works much more effectively in gasoline sulfur reduction in its oxidized state. The improvement comprises increasing the average oxidation state of the metal component of the regenerated cracking catalyst by further oxidative treatment.

Three patents granted to Mobil and W. R. Grace jointly, (U.S. Pat. No. 6,846,403, U.S. Pat. No. 6,923,903 and U.S. Pat. No. 6,974,787) disclose a method of reducing gasoline sulfur using a metal-containing zeolite catalyst where a first metal (preferably vanadium) in an oxidation state above zero is located within the interior pore structure of the zeolite together with a second metal of a rare earth component (preferably cerium). The presence of both vanadium and rare earth metal on the catalyst gives rise to better gasoline sulfur reduction than vanadium alone, possibly due to the high active sites retention with rare earth metals.

SUMMARY OF THE INVENTION

In accordance with this invention a sulfur reduction catalyst is provided comprising a metal vanadate compound. The sulfur reduction catalyst can be added to the cracking catalyst inventory as a separate particle or may be included with a catalytic cracking component comprising a molecular sieve such as a zeolite and a matrix material to produce liquid cracking products having a reduced sulfur contact. The metal vanadate compound comprises vanadium in an oxidation state above zero and an additional metal in cationic form.

DETAILED DESCRIPTION OF THE INVENTION

Figure 1:
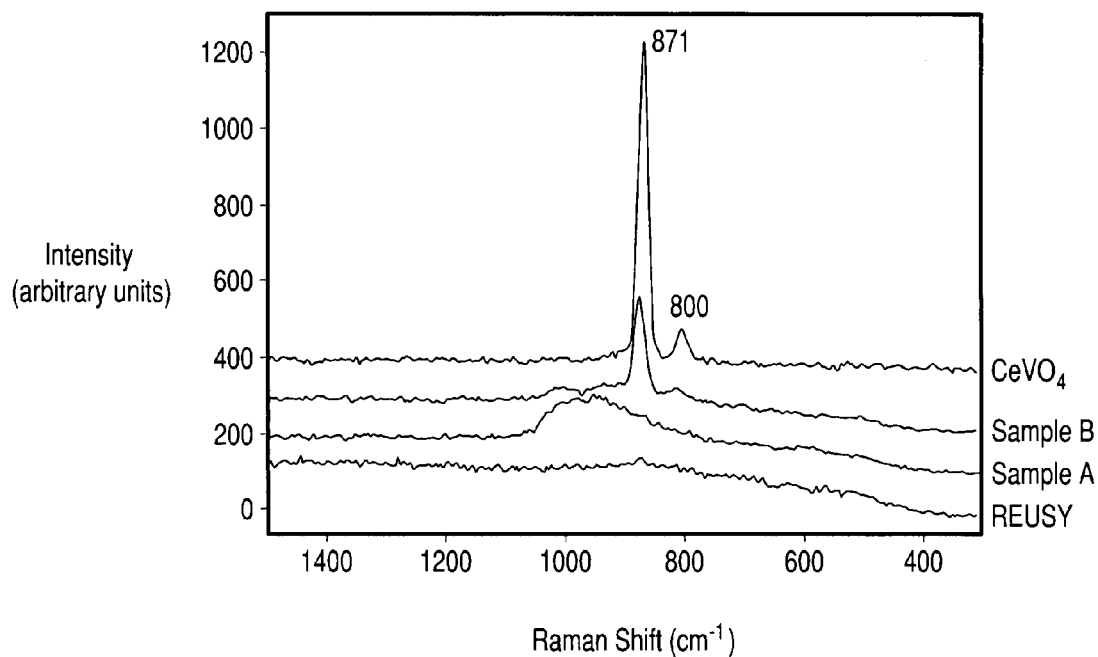
FIG. 1. is a UV-Raman spectra of $CeVO_4$ as a reference compound, the support (REUSY), V/REUSY (Sample A) and Ce+V/REUSY (Sample B).

In accordance with the present invention, the sulfur content of the gasoline portion of a liquid cracking product formed during catalytic cracking of a hydrocarbon feedstock is effectively brought to lower and more acceptable levels by carrying out the catalytic cracking in the presence of the novel sulfur reduction catalyst of this invention comprising a metal vanadate compound. The metal vanadate compound or metal-vanadium oxide complex ($M_xV_yO_z$) if supported on a molecular sieve is located primarily on the exterior of the support structure. If supported on a molecular sieve such as a zeolite, the $M_xV_yO_z$ compound is provided exterior of the pore structure of the zeolite and on the surface of any matrix material integral with the catalyst. For $M_xV_yO_z$, M is one or more metals, x is 0.5 to 10, y is 1 to 10, and z is a value to balance the charge.

The term "molecular sieve" is used herein to designate a class of polycrystalline materials that exhibits selective sorption properties which separates components of a mixture on the basis of molecular size and shape differences, and have pores of uniform size, i.e., from about 3 angstroms to approximately 100 angstroms which pore sizes are uniquely determined by the unit structure of the crystals. See R. Szostak, Molecular Sieves: Principles of Synthesis and Identification, pp. 1-4 and D. W. Breck, Zeolite Molecular Sieves, pp. 1-30. A molecular sieve framework is based on an extensive three-dimensional network of oxygen atoms containing generally tetrahedral type-sites. In addition to the $Si^4$ and $Al^3$ that compositionally define zeolite molecular sieves, other cations also can occupy these sites. These need not be iso-electronic with $Si^4$ or $Al^3$, but must have the ability to occupy framework sites. Cations presently known to occupy these sites within molecular sieve structures include but are not limited to Be, Mg, Zn, Co, Fe, Mn, Al, B, Ga, Fe, Cr, Si. Ge, Mn, Ti, and P. Non-limiting examples of molecular sieves useful as supports for the metal vanadate compound include zeolite Y, REY, USY, REUSY, Beta or ZSM-5. In-situ FCC zeolite Y catalysts developed by Engelhard are particularly useful supports and are disclosed in, for example, U.S. Pat. Nos. 3,932,968; 4,493,902; 6,656,347; 6,673,235; and 6,716,338. The entire contents of each of the above U.S. patents are herein incorporated by reference. Macroporous supports in which the zeolite crystals coat the walls of macropores contained in a alumina-containing matrix and catalytic supports containing dispersible boehmite are useful and disclosed in the patents mentioned immediately preceding.

The metal vanadate compound ($M_xV_yO_z$) may also be provided on a particle separate from the FCC cracking component. In such case, the metal vanadate compound can be supported on any known metal oxide support. Non-limiting examples of useful supports include silica, alumina, silica-alumina, titania, zinconia, and any mixtures or solid solutions thereof.

FCC Process

The present sulfur reduction catalyst if also containing a cracking function in addition to the sulfur removal function can be used as part of or as the whole cracking component of the circulating inventory of catalyst in the catalytic cracking process, FCC process. For convenience, the invention will be described with reference to the FCC process although the present catalysts could be used in the older moving bed type (TCC) cracking process with appropriate adjustments in particle size to suit the requirements of the process. Apart from the addition of the present catalyst to the catalyst inventory and some possible changes in the product recovery section, the manner of operating the process will remain unchanged. If used as an additive, the catalyst of this invention is added to a conventional FCC catalyst, for example, zeolite based catalysts with a faujasite cracking component as is well known.

Somewhat briefly, the fluid catalytic cracking process in which the heavy hydrocarbon feed containing the organosulfur compounds will be cracked to lighter products takes place by contact of the feed in a cyclic catalyst recirculation cracking process with a circulating fluidizable catalytic cracking catalyst inventory consisting of particles having a size ranging from about 20 to about 100 microns. The significant steps in the cyclic process are:

(i) the feed is catalytically cracked in a catalytic cracking zone, normally a riser cracking zone, operating at catalytic cracking conditions by contacting feed with a source of hot, regenerated cracking catalyst to produce an effluent comprising cracked products and spent catalyst containing coke and strippable hydrocarbons;

(ii) the effluent is discharged and separated, normally in one or more cyclones, into a vapor phase rich in cracked product and a solids rich phase comprising the spent catalyst;

(iii) the vapor phase is removed as product and fractionated in the FCC main column and its associated side columns to form liquid cracking products including gasoline;

(iv) the spent catalyst is stripped, usually with steam, to remove occluded hydrocarbons from the catalyst, after which the stripped catalyst is oxidatively regenerated to produce hot, regenerated catalyst which is then recycled to the cracking zone for cracking further quantities of feed.

The present sulfur reduction additives can be used in the form of a supported particle additive which is added to the main cracking catalyst in the FCCU. Alternatively, the catalyst of this invention may contain both a cracking function and sulfur reducing function ($M_xV_yO_z$) and can serve as a part of or as the total cracking catalyst in the FCCU. As previously described, the cracking catalyst will normally be based on a faujasite zeolite active cracking component, which is conventionally zeolite Y in one of its forms such as calcined zeolite Y (Y), rare-earth exchanged type Y zeolite (REY), or rare-earth exchanged or un-exchanged ultrastable type Y zeolite (REUSY) or (USY). Other cracking catalysts can be used in whole or as a part of the circulating cracking catalyst inventory, such as a zeolite beta or ZSM-5, etc. The active cracking component is routinely combined with a matrix material such as alumina in order to provide the desired mechanical characteristics (attrition resistance etc.) as well as activity control for the very active zeolite component or components. Other well known metal oxides can be used singularly or in combination to provide the matrix component. In-situ formed faujasite zeolite Y from a kaolin-based matrix is particularly useful. The particle size of the catalyst of this invention is typically in the range of 10 to 150 microns for effective fluidization. If used as a particle additive separate from the main catalyst cracking component, the catalyst of this invention with sulfur reduction function is normally selected to have a particle size comparable with that of the cracking catalyst so as to prevent component separation during the cracking cycle.

Cracking and Sulfur Reduction Component Catalyst

As known from the literature (Baes, C. F., Jr.; Mesmer, R. E. The Hydrolysis of Cations; Wiley: New York, 1970), the form of vanadium (V) oxide species in aqueous solution is a function of both pH and V(V) concentration. At a pH level of 6-8 and V(V) concentration above 0.1 M, the vanadium oxide species are present as $V_4O_{12}^{4-}$ clusters. Between pH 2 and 6, the vanadium species in the solution are predominantly decavanadate clusters such as $V_{10}O_{28}^{6-}$, $HV_{10}O_{28}^{5-}$ and $H_2V_{10}O_{28}^{4-}$ at a vanadium concentration level above 0.01 M. At pH lower than 2, $V_2O_5$ crystal is formed and precipitates out of the solution.

The present invention uses complex vanadate anions, such as, for example, decavanadate anions, with other metal cations to load both vanadium and metal cations simultaneously onto a support such as a FCC catalyst which comprises a molecular sieve such as a zeolite with or without rare earth exchange and a matrix material. The concentration of vanadium anions in the aqueous metal loading solution is in the range of 0.01-1 M. Exemplified concentrations of vanadium anions in an aqueous solution range from 0.05-0.5 M and 0.1-0.3 M. The other metals in cationic form which are loaded onto the support include Zn, Mn, Al, Mg, Ni, Cu, rare earths. Typically the metals are added as metal salts including chloride, nitrate, sulfate, salts as non-limited examples. The levels of vanadium as metal on the support should be at least 0.05 wt. % of the catalyst. Levels of vanadium can also range from at least about 0.5 wt. % to about 10 wt. % based on the weight of the catalyst particle. The level of the other metal as metal will generally range from at least about 0.01 wt. %, typically at least about 1.0 wt. % up to about 10 wt. % of the catalyst. Generally, the metal vanadate will comprise at least 0.1 wt. %, generally 0.1-15 wt. %, typically 0.5 to 5 wt. % of the catalyst.

Because of the size and negative charge of the vanadate species loaded onto the molecular sieve cracking component, for example, decavanadate anions, the ion-exchange of decavanadate anions in the pore structure of the zeolite does not occur. Accordingly, after impregnation the large vanadium anions are present primarily on the outside of the pore structure of the molecular sieve, e.g. zeolite, and, on the surface of the matrix material. The other metal cations, such as Zn or Ce, loaded onto the zeolite are likely present in the vicinity of the vanadium anions because of the electronic charge attraction. This unique arrangement of vanadium anions and metal cations primarily outside of the pore structure of the zeolite and on the surface of the matrix material results in the formation of uniformly dispersed metal vanadates on the FCC catalyst support after calcination. In general, the atomic ratio of vanadium on the surface of the catalyst support to the vanadium in the bulk of the support is greater than 1.5. Ratios of V (surface) to V (bulk) of greater than 2, and even greater than 3 are useful. It has further been found that treating the support with a base, e.g., ammonium hydroxide, prior to addition of the vanadium complex aids in maintaining the vanadium complex on the exterior surface of the porous support.

The metal vanadate material can be used to efficiently reduce gasoline sulfur content in the catalytic cracking process. In addition, the formation of metal vanadate outside the pore structure of the zeolite reduces the damaging effect of vanadium since zeolite destruction by vanadium occurs when vanadium is within the zeolite pores (1. C. A. Trujillo, U. N. Uribe, P.-P. Knops-Gerrits, L. A. Oviedo A., P. A. Jacobs, J. Catal. 168, 1 (1997). 2. F. Mauge, J. C. Courcella, Ph. Engelhard, P. Gallezot, J. Grosmangin, Stud. Surf. Catal. 28, 803 (1986). 3. M. Torrealba, M. R. Golwasser, Appl. Catal. 90, 35 (1992). 4. M. Xu, X. Liu, R. J. Madon, J. Catal. 207, 237 (2002)). The current invention provides a catalytic cracking product sulfur reduction catalyst with high zeolite stability and high catalytic cracking activity.

Experimental Description

The gasoline sulfur reduction catalyst can be prepared using a FCC catalyst as the support. The support is typically loaded by incipient-wetness impregnation with a homogeneous mixed solution of vanadium (V) anions and metal cations selected from Ce, Zr, Zn, Mn, Mg, Al, Ti, etc. A mixed solution of ammonium metavanadate and metal salt can be made for impregnation. Before adding certain metal salts, such as Ce or Zn nitrate, the solution of ammonium metavanadate has to be adjusted to a pH of 2-4 to avoid precipitation due to formation of Ce or Zn vanadates at higher pH. The addition of a base, such as an organic base prior to lowering the pH has been found to reduce precipitation. The vanadium concentration in the mixed solution should also be higher than 0.01 M, and will vary depending on the pore volume of the FCC catalyst and the target vanadium concentration on the FCC catalyst. The final product is obtained after drying and calcination at high temperatures.

Metal vanadate can be used as a component in a particle devoid of a cracking component such as a metal oxide or mixed metal oxide support. Incorporation of the metal vanadate onto the metal oxide support by incipient-wetness impregnation as discussed above can be used.

Calcination of the impregnated supports can be accomplished in-situ during the catalytic cracking process although calcination prior to incorporation of the sulfur reducing catalyst to the circulating FCC catalyst inventory is preferred.

EXAMPLE 1

Preparation of Catalysts

A FCC catalyst (REUSY) with a unit cell size of 2.46 nm was used as the support. A V/REUSY catalyst, Sample A, was prepared by incipient wetness impregnation of aqueous ammonium metavanadate solution to obtain 0.6 wt % V on the support. The ammonium metavanadate solution was prepared by dissolving ammonium metavanadate solid in water at a temperature between 80-95° C., followed by cooling down to below 55° C. before the impregnation. The sample was further dried and calcined at 550° C. for 2 hours.

A Ce+V/REUSY catalyst, Sample B, was prepared by incipient wetness impregnation of a mixed aqueous solution of ammonium metavanadate and cerium nitrate to obtain 0.6 wt % V and 1 wt % Ce on the support. The ammonium metavanadate solution was firstly prepared by dissolving ammonium metavanadate solid in water at a temperature between 80-95° C., followed by cooling down to below 55° C. The pH of the ammonium metavanadate solution was adjusted to ~3 by nitric acid before adding cerium (III) nitrate to the solution. After impregnation the sample was further dried and calcined at 550° C. for 2 hours.

Another Ce+V/REUSY catalyst, Sample C, was prepared similarly to Sample B to obtain 0.6 wt % V and 1.5 wt % Ce on the support (V/Ce atomic ratio ~1). The sample was dried and calcined at 550° C. for 2 hours.

A Ce/REUSY reference, Sample D, was prepared by incipient wetness impregnation method with an aqueous solution of cerium nitrate to target 1 wt % Ce on the support. The impregnated Ce/REUSY was dried and calcined at 550° C. for 2 hours.

A CE+V/REUSY catalyst, Sample E, was prepared by incipient wetness impregnation of a mixed aqueous solution of ammonium metavanadate and cerium nitrate to obtain 0.6 wt % V and 1.4 wt % Ce on the support in a process slightly different from Samples B & C. The ammonium metavanadate solid was dissolved in water that contained tetramethyl ammonium hydroxide (25% TMAH) solution at a temperature between 80-95° C. to obtain a vanadium anion solution at a pH of ~8. The solution was cooled down to below 55° C., followed by adding nitric acid to lower the pH to ~3 before adding cerium (III) nitrate to the solution. The addition of TMAH or other base improves the solubility of ammonium metavanadate and stability of vanadium anions. In general, organic bases have been found useful in improving the solubility of the vanadate anion. Exemplified organic bases include alkyl ammonium hydroxide containing 1 to 4 alkyl groups each of which contains 1 to 4 carbon atoms. Additionally, other known bases can be used to improve solubility including, for example, alkali metal hydroxide, e.g. sodium hydroxide. After impregnation the sample was further dried and calcined at 550° C. for 2 hours.

The surface areas of Samples A-C were measured by N2 BET method. V and Ce loadings were analyzed by X-ray Fluorescence (Panalytical PW2400). The results are shown in Table 1.

TABLE 1

Physical and Chemical Properties of Calcined Samples

| | V loading (wt %) | Ce loading (wt %) | Surface area (m$^2$/g) |
|---|---|---|---|
| Sample A | 0.62 | n.a. | 333 |
| Sample B | 0.66 | 1.10 | 353 |
| Sample C | 0.60 | 1.52 | 366 |

EXAMPLE 2

Catalyst Study by UV-Raman Spectroscopy

UV-Raman spectroscopy was employed to characterize the surface species on the FCC catalyst support. The use of a UV-Raman spectrometer instead of a regular Visible Raman is due to the strong fluorescence of the FCC support when using a Visible Raman spectrometer. The UV-Raman spectra were collected by a Renishaw inVia Raman microscope instrument using a Lexel 244 nm excitation laser and a CCD detector. CeVO$_4$ compound (CeN atomic ratio=1) was used as a reference. The crystalline phase of CeVO$_4$ was confirmed by X-ray Diffraction as wakefieldite (JCPDS 97-004-9427) phase.

UV-Raman spectra of CeVO$_4$, the FCC support (REUSY) and Samples A and B taken under ambient condition are shown in FIG. 1. For V/REUSY (Sample A), a broad Raman band was observed at 950-1000 cm$^{-1}$, which was assigned to surface decavanadate and metavanadate species (G. Deo and I. E. Wachs, J. Phys. Chem. 95, 5889(1991)). For Ce+V/REUSY (Sample B), the Raman signal due to surface vanadium species was very weak, while a strong Raman peak was observed at 871 cm$^{-1}$ due to the formation of CeVO$_4$ crystalline phase on the FCC catalyst support. The UV-Raman result clearly demonstrated that the crystalline phase of CeVO$_4$ compound was formed when a solution containing vanadium anions and cerium cations was loaded simultaneously onto a FCC catalyst support.

EXAMPLE 3

Catalyst Study by UV-Visible Diffuse Reflectance Spectroscopy (DRS)

Figure 2:
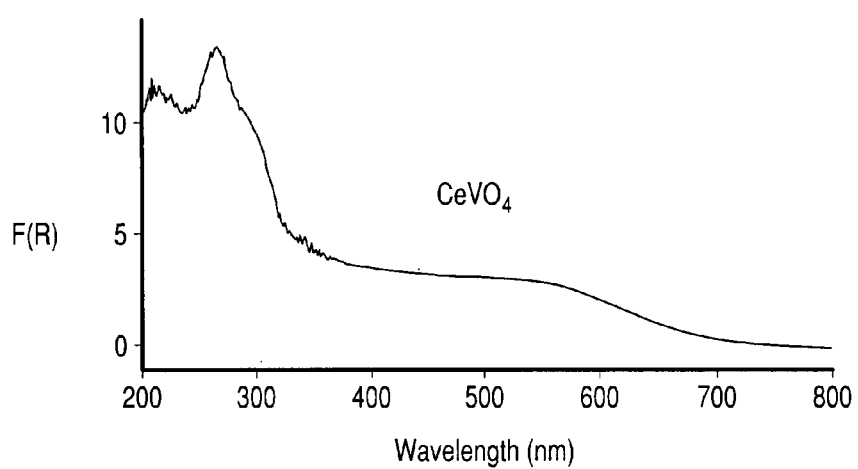
FIG. 2. is a UV-vis spectrum of the $CeVO_4$ compound reference.
Figure 3:
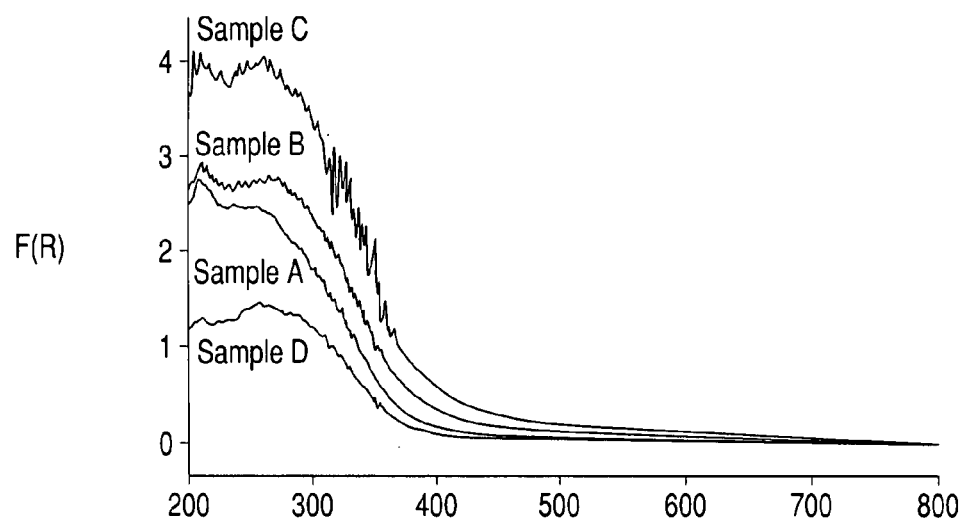
FIG. 3. is a UV-vis spectra along 200-800 nm of Ce/RE-USY (Sample D), V/REUSY (Sample A) and Ce+V/REUSY (Samples B & C).
Figure 4:
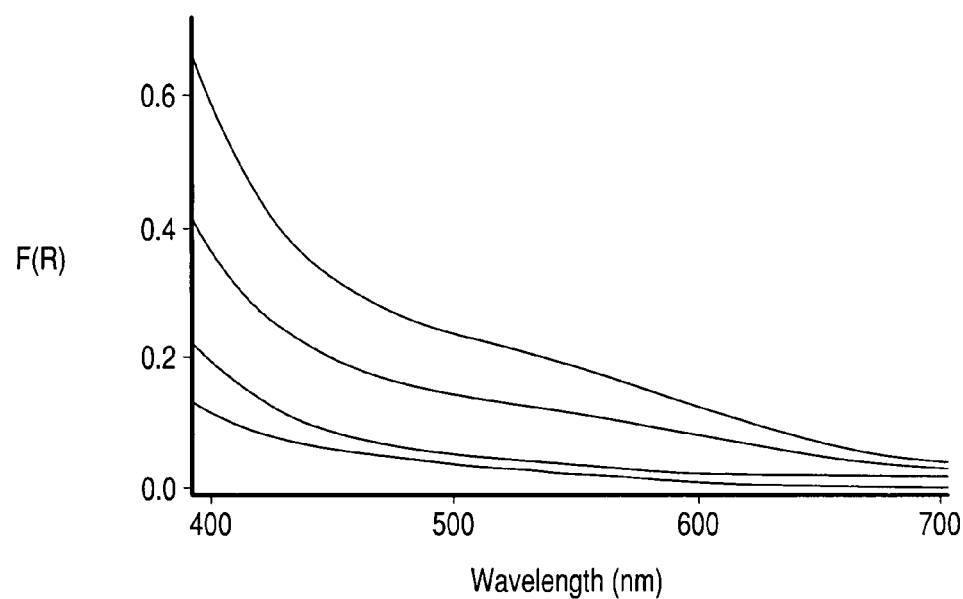
FIG. 4. is a UV-vis spectra along 400-700 nm of Ce/RE-USY (Sample D), V/REUSY (Sample A) and Ce+V/REUSY (Samples B & C).

UV-Visible DRS spectra expressed by (Schuster)-Kubelka-Munk function F(R) were collected using a diffuse reflectance attachment with an integrating and reference sphere coated with BaSO$_4$ inside a Cary 300 UV-Vis spectrometer. The spectra of CeVO$_4$ and Samples A, B, C, D are shown in FIGS. 2 and 3, respectively. A broad adsorption band centered around 540 nm due to CeVO$_4$ compound phase was only observed for Samples B and C with Sample C having a stronger adsorption, see FIG. 4. Since the intensity of F(R) is proportional to the concentration of absorbing species (G. Kortüm, "Reflectance Spectroscopy: Principles, Methods, Applications", Springer-Verlag New York Inc., Trans. Lohr, J. E., 1969), the UV-Vis DRS result clearly demonstrated that the content of CeVO$_4$ on Sample C is higher than Sample B.

EXAMPLE 4

Catalyst Study by X-Ray Photoelectron Spectroscopy (XPS)

XPS can provide atomic information on the material surface with a detection depth of 5-10 nm ("Handbook of X-ray Photoelectron Spectroscopy", Moulder, J. F. et. al., pg. 11, 1995). XPS spectra were collected by a VG Scientific 220i XL X-ray Photoelectron Spectrometer with an Al k alpha monochromatic source, pass energy=40 eV, binding energy referenced to C1s=284.6 eV, vacuum=$2\times10^{-8}$ or better.

Table 2 compares the surface and bulk atomic ratios of V/(Si+Al) and Ce/(Si+Al) for Samples B, C and D obtained by XPS. The surface atomic ratio represents the elemental concentration of V or Ce relative to the matrix Al+Si atoms on the surface of the FCC catalyst support within a XPS detection depth of 5-10 nm. The bulk atomic ratio represents the average elemental concentration of V or Ce relative to the matrix Al+Si atoms of the FCC catalyst support, which was obtained by XPS after the support microspheres were crushed/ground into very fine particles. Although Samples B and D had the same 1 wt % Ce on the support, the Ce concentration of Sample B detected by XPS was ten times higher than that of Sample D. Ce cations alone are usually expected to be ion-exchanged into the pores of zeolite structure. Sample D demonstrated that the ion-exchange of cerium cations in the pores of the zeolite in FCC catalyst microsphere resulted in a very low Ce concentration being detected by XPS. On the other hand, the remarkably high surface concentration of Ce ions on Sample B confirmed that $CeVO_4$ phase was formed on the exterior of the support. Sample C with 1.5 wt % Ce had much higher Ce concentration on the surface than Sample B, clearly indicating that the majority of Ce and V (atomic ratio V/Ce~1) in Sample C forms a $CeVO_4$ compound phase. This conclusion is in agreement with the UV-Vis DRS results in Example 3.

Table 2 demonstrated that both V and Ce concentrations on the surface of the FCC catalyst support are much higher than the bulk concentrations, clearly indicating that the support surface is highly enriched in vanadium and cerium atoms. The formation of metal vanadate compound as gasoline sulfur reduction component on the surface of the support provides better access to sulfur compound molecules, which will give rise to desired sulfur reduction capability.

TABLE 2

Surface and bulk atomic ratios of V/Al + Si and Ce/(Al + Si)

| | V/(Al + Si) atomic ratio | | Ce/(Al + Si) atomic ratio | |
|---|---|---|---|---|
| | Surface | Bulk | Surface | Bulk |
| Sample B | 0.045 | 0.011 | 0.022 | 0.0046 |
| Sample C | 0.083 | 0.0097 | 0.040 | 0.0055 |
| Sample D | n.a. | | 0.0019 | n.a. |

EXAMPLE 5

Catalyst Evaluation by Fluid Catalytic Cracking

The V and Ce+V on REUSY catalysts from Example 1 were evaluated after steam deactivation together with an equilibrium catalyst from an FCC unit. The equilibrium catalyst had moderate metal levels (1440 ppm V and 1037 ppm Ni). 20 wt % of the sample catalyst was blended with 80 wt % ECat and then steam deactivated in a fluidized bed steamer at 788° C. (1450° F.) with 90% steam/10% air for 4 hours.

The steam deactivated blends were tested by a commercially available fluidized-bed reactor manufactured by Xytel Corp. under the trade name ACE (Advanced Catalyst Evaluation). A standard constant time on stream testing method was used where different catayst-to-oil ratios were obtained by changing the fraction of active catalyst weight (C. P. Kelkar, M. Xu, R. J. Madon, Ind. Eng. Chem. Res. 42, 426 (2003)). The feed was a FCCU gas oil with the feed properties shown in Table 3. The gasoline sulfur content was determined by a GC-AED at a cut point of 430° F.

TABLE 3

Feed properties

| API GRAVITY | 60° F. | 23.29 |
|---|---|---|
| Aniline Point | ° F. | 174 |
| SULFUR | wt. % | 1.21 |
| BASIC N | ppm | 380 |
| TOTAL N | ppm | 1050 |
| Ni | ppm | 0.3 |
| V | ppm | 0.2 |
| Conradson Carbon Distillation | wt % | 0.25 |
| IBP | ° F. | 402 |
| 5 | ° F. | 561 |
| 10 | ° F. | 617 |
| 30 | ° F. | 727 |
| 50 | ° F. | 799 |
| 70 | ° F. | 871 |
| 90 | ° F. | 969 |
| FBP | ° F. | 1093 |

The FCC performance of steam deactivated blends of Samples A, B and C with ECat are compared in Table 4 at a constant 70% conversion. Compared to the ECat base, the cracking product distributions changed with the addition of 20% V/REUSY or Ce+V/REUSY (Samples A, B and C). The hydrogen and coke yields are higher due to the introduction of vanadium. However, the formation of cerium vanadate apparently reduced the hydrogen and coke debits by vanadium. On the other hand, the formation of cerium vanadate significantly increased the gasoline yield and reduced the LPG and C4 gas yields. Most importantly, the formation of a $CeVO_4$ compound phase gave rise to a higher gasoline sulfur reduction capability. Compared to a 26% gasoline sulfur reduction for the reference V/REUSY (Sample A), Sample C with a major of $CeVO_4$ compound phase had a 46% improvement over Sample A in gasoline sulfur reduction. These results clearly demonstrated that the cerium vanadate phase is more effective than vanadium species alone for gasoline reduction on a FCC catalyst support.

TABLE 4

Catalytic cracking performances

| | Ecat Base case | +20% V/REUSY Sample A | +20% Ce + V/REUSY Sample B | +20% Ce + V/REUSY Sample C |
|---|---|---|---|---|
| Conversion, wt % | 70 | 70 | 70 | 70 |
| Cat./Oil | 5.19 | 6.18 | 6.08 | 5.92 |
| H2 yield, wt % | 0.08 | +0.19 | +0.13 | +0.15 |
| Total C2 gas, wt % | 1.60 | +0.29 | +0.18 | +0.17 |
| LPG, wt % | 15.58 | −1.27 | −1.37 | −1.58 |
| Total C4 gas, wt % | 17.18 | −0.99 | −1.19 | −1.42 |

TABLE 4-continued

| | Ecat Base case | +20% V/REUSY Sample A | +20% Ce + V/REUSY Sample B | +20% Ce + V/REUSY Sample C |
|---|---|---|---|---|
| Gasoline yield, wt % | 47.67 | +0.04 | +0.68 | +0.96 |
| LCO, wt % | 18.83 | +0.52 | +0.32 | +0.54 |
| HCO, wt % | 11.17 | −0.52 | −0.32 | −0.54 |
| Coke, wt % | 5.15 | +0.94 | +0.51 | +0.46 |
| Gasoline S at 430° F., ppm | 620 | 456 | 428 | 384 |
| % S Reduction at 430° F. | Base | 26 | 31 | 38 |

The invention claimed is:

1. A sulfur reduction catalyst for reducing the sulfur content of a fluidized catalytic cracking product comprising:
   (i) a molecular sieve support, and
   (ii) 0.1 to 15 wt. % based on the weight of the catalyst of metal vanadate compound contained on the support, the atomic ratio of vanadium on the surface of the support to the vanadium in the bulk of support is greater than 1.5.

2. The sulfur reduction catalyst of claim 1, wherein the metal in said metal vanadate compound is one or more metals selected from the group consisting of rare-earth metal, Zn, Mn, Zr, Al, Mg, Ni, and Cu.

3. The sulfur reduction catalyst of claim 2, wherein said metal vanadate is cerium vanadate or zinc vanadate.

4. The sulfur reduction catalyst of claim 1, wherein the sulfur reduction catalyst further comprises a matrix.

5. The sulfur reduction catalyst of claim 4, wherein the matrix is an oxide selected from the group consisting of $SiO_2$, $Al_2O_3$, $SiO_2$—$Al_2O_3$, $TiO_2$, $ZrO_2$, and mixtures thereof.

6. The sulfur reduction catalyst of claim 1, wherein the support comprises a zeolite molecular sieve.

7. The sulfur reduction catalyst of claim 6, wherein the zeolite molecular sieve is selected from the group consisting of Y, USY, REY, REUSY, zeolite beta, ZSM-5, and mixtures thereof.

8. The sulfur reduction catalyst of claim 1, containing 0.1 to 5 weight percent of metal vanadate compound, based on the weight of the catalyst.

9. The sulfur reduction catalyst of claim 1, wherein the molecular sieve support has a particle size of from about 10-150 microns.

10. The sulfur reduction catalyst of claim 1, wherein the atomic ratio of vanadium on the surface of the support to the vanadium in the bulk of support is greater than 3.

11. A method of preparing a sulfur reduction catalyst according to claim 1 comprising loading at least one vanadium-containing anion onto a molecular sieve support and calcining said loaded support.

12. The method of claim 11, wherein said vanadium-containing anion is an aqueous solution of ammonium metavanadate, said method further comprising adding a base and/or acid to said aqueous solution to adjust solution pH.

13. The method of claim 12, wherein said base is an alkyl ammonium hydroxide.

14. The method of claim 11, wherein said vanadium anion is an anion or mixture of anions with the number of vanadium atoms ranging from 1 to 10.

15. The method of claim 11, comprising treating said support with a base prior to said loading.

16. The method of claim 11, comprising loading at least one metal cation other than vanadium onto said support and forming a metal vanadate compound on said support during said calcining.

* * * * *